No. 800,828. PATENTED OCT. 3, 1905.
C. A. ROLFE.
ELECTRICAL PROTECTIVE APPARATUS.
APPLICATION FILED MAY 18, 1903.
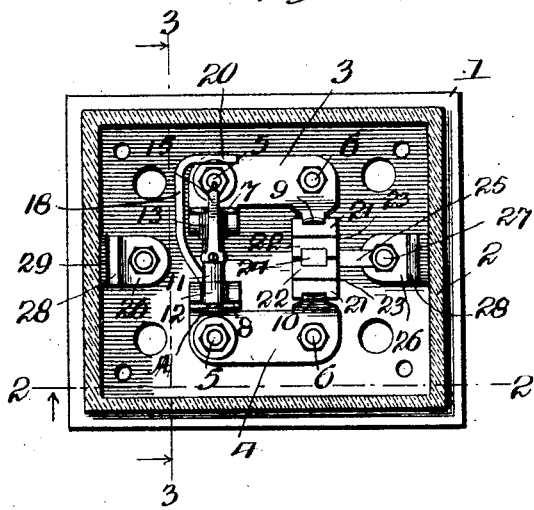
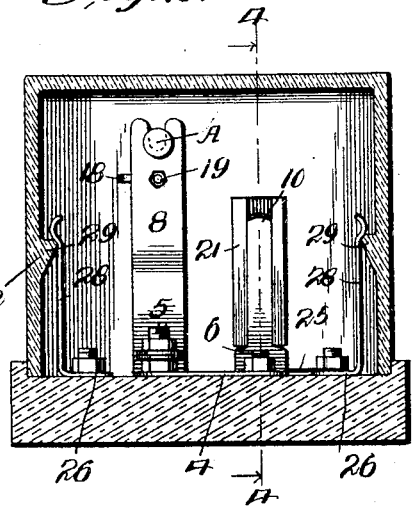
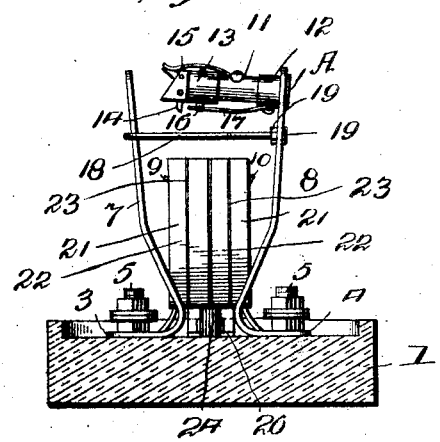
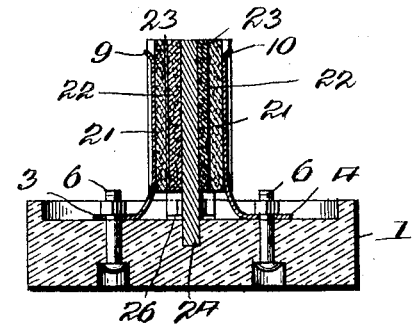
Witnesses:
Inventor:
Charles A. Rolfe.
By A. Miller Belfield
Attorney.

UNITED STATES PATENT OFFICE.

CHARLES A. ROLFE, OF ADRIAN, MICHIGAN, ASSIGNOR, BY MESNE ASSIGNMENTS, TO ROLFE ELECTRIC CO., OF ROCHESTER, NEW YORK, A CORPORATION OF NEW YORK.

ELECTRICAL PROTECTIVE APPARATUS.

No. 800,828.     Specification of Letters Patent.     Patented Oct. 3, 1905.

Application filed May 18, 1903. Serial No. 157,733.

*To all whom it may concern:*

Be it known that I, CHARLES A. ROLFE, a citizen of the United States, residing at Adrian, in the county of Lenawee and State of Michigan, have invented a certain new and useful Improvement in Electrical Protective Apparatus, of which the following is a full, clear, concise, and exact description, reference being had to the accompanying drawings, forming a part of this specification.

My invention relates to electrical protective apparatus for protecting electrical circuits and instruments from unduly-strong currents.

Prominent objects of the invention are to provide a simple, practical, and effective form of protector, to reduce the expense of affording adequate protection to electrical circuits, and to accomplish these results in an efficient and satisfactory manner.

In an application filed by me April 25, 1903, Serial No. 154,371, electrical protective system, I have shown and described a system of electrical protection by which adequate protection is secured for electrical instruments and circuits by the use of a single protective device for each instrument in contradistinction to employing two such devices for each instrument, one arranged on each side of the circuit at the terminals of the instrument. In another application, also filed by me, of even date herewith, Serial No. 157,732, I have shown a form of protective device especially adapted for use in connection with said system. The devices shown in this latter application are arranged in bank form—that is, associated together in switchboard fashion—for use at central stations. In my present application I will show and describe a protective device also adapted to be used in said system, but particularly adapted for use at a subscriber's station or an outlying instrument, and to such end made in the form of what is called an "individual" protector. In the system of my said other application I arrange a protective device in shunt across the terminals of the instrument and provide means by which when the device operates a short circuit is formed in it, thereby short-circuiting the circuit across the terminals of the instrument and diverting the unduly-strong current from the latter. In this way a single protective device affords adequate protection for the instrument, and thus the expense of two such devices, one on each side of the line, is saved. The protector which I show herein for carrying out my present invention therefore involves an individual protective device adapted for use in connection with a single instrument and embodying an excess-operated device operable upon the passage of an unduly-strong current in the circuit and means for forming a low conductivity path between terminals upon the operation of such excess-operated device.

In the accompanying drawings, Figure 1 is a plan view of a protector embodying my present invention with a glass dome shown in horizontal section. Figs. 2 and 3 are sections taken on line 2 2 and 3 3, respectively, in Fig. 1; and Fig. 4 is a section taken on line 4 4 in Fig. 2.

The device shown in the drawings consists of a base 1, made of insulating material—such as slate, porcelain, or the like—and a glass dome 2, mounted on the base 1. The base 1 is provided with terminals 3 and 4, secured thereto by screws 5 5 and 6 6. The terminals 3 and 4 are constructed with springs 7 and 8, respectively, which rise from corresponding ends of said terminals, and also with springs 9 and 10, which rise from the opposite ends thereof. The springs 7 and 8 tend to separate from one another, but are normally held in restraint by a heat-cartridge A. This cartridge is fully set forth and claimed in other applications of mine, Serial No. 104,021, filed April 21, 1902, and Serial No. 143,224, filed February 13, 1903, and hence will be referred to here only briefly. It consists of a body 11, of insulating material, such as hard rubber, provided at its ends with caps 12 and 13, whereof the cap 12 is adapted to engage the spring 8, and the cap 13 has a slotted end provided with a trigger 14. A spring 15 is secured to the body 11 and extended over the cap 13 and to the bent end of the trigger 14 and presses down upon the same. A stick 16, of high-resistance graphite or the like, is fitted in the end of the body 11 and has its upper end in contact with the upper surface of the cap 13 and its lower end in contact with a spring-clip 17, which extends to and is connected with the cap 12. The trigger 14 is held in position by a heat-susceptible material, such as solder. Under normal conditions the lower end of the trigger 14 engages the spring 7, thereby holding the two springs in restraint; but when an abnormally strong current traverses the circuit the solder holding the trigger 14 in position becomes softened or melted by the heat generated in the graphite stick 16, whereby the trigger 14 is permitted to swing, and the springs 7 and 8 are released and fly apart from one another.

The spring 8 is provided with a metal bar or rod 18, which is secured to it, as by nuts 19 19, and this rod or bar is bent first laterally to one side and then laterally to the other, as shown in Fig. 1, so as have an end portion 20, which comes into position outside or in the rear of the spring 7. Thus when the heat-cartridge A operates to release the springs 7 and 8 the spring 7 will fly out and come into contact with the end 20 of the rod 18, as shown in Fig. 3.

Lightning-arrester carbons 21 21 and 22 22 are fitted between the springs 9 and 10 and held in position thereby. The carbons 21 21 are line-carbons and the carbons 22 22 ground-carbons, and the former are separated from the latter by insulating material 23 23, such as mica strips or layers of silk or the like. A post 24 is secured to the base 1 and fitted between the ground-carbons 22 22, which are slotted to receive the same, as shown in Fig. 1. The post 24 is connected by a metallic strip 25 with a terminal 26, secured to the base 1 by a screw 27. This terminal 26 is understood to be connected with a ground-wire, thus connecting the ground-carbons 22 22 with ground. A similar plate 26 is secured to the opposite side of the base 1, and both of these plates 26 26 are provided with upwardly-extending clips 28 28, having laterally-bent upper ends. These are adapted to engage projections 29 29 on the inside of the dome 2, thereby holding the latter against removal.

The instrument is understood to be connected in circuit by connecting the terminals 3 and 4 in shunt in the circuit, which connection is made to the binding-screws 5 5, and the terminal 26 is connected with the ground, as hereinbefore set forth. In its normal condition, therefore, the instrument is in the condition shown in Figs. 1 and 2. When, however, an unduly-strong current traverses the circuit, the heat-cartridge A operates, releasing the springs 7 and 8, which thereupon separate, allowing the spring 7 to make contact with the bent end 20 of the rod 18, thus forming a low-resistance connection between the springs 7 and 8 and short-circuiting the shunt including the device across the terminals of the instrument. After operation the trigger 14 of the heat-cartridge is automatically returned to its original position by the spring 15 and is automatically resoldered in such returned or reset position. It will be understood, of course, that this device, being in shunt across the circuit containing the instrument under protection, has its resistance, consisting largely of the resistance of the high-resistance graphite stick 16, so proportioned as to receive the proper amount of current traversing the circuit to allow it to remain in normal condition under the normal current and operate upon a predetermined abnormal current.

It will be seen that ample protection is afforded both to the instrument and circuit by the use of a single device of the kind herein set forth, whereas heretofore such protection has required the use of two such protective devices, one on each side of the circuit at the terminals of the instrument. It will also be seen that the protective device does not interfere in the least with the currents traversing the circuit under protection—as, for example, voice-currents of a telephone-circuit—because such currents as pass through the instrument do not traverse the protector.

It will be understood that the device herein shown and described can be varied and modified without departing from the spirit of my invention.

What I claim is—

1. An electrical-circuit protector, comprising a pair of line-springs, a heat-cartridge supported thereby and holding the line-springs normally in restraint, said cartridge having provisions for automatically restoring itself to operative condition, and a connection attached to one of the line-springs and extending around and in the rear of the other so as to form a low-resistance connection between the two springs on the release thereof by the operation of the heat-cartridge.

2. An electrical-circuit protector comprising a pair of line-springs, a solder-joint heat-cartridge supported thereby and holding the springs normally in restraint, said cartridge having provisions for automatically resoldering itself in operative condition, and a metallic rod on one of the line-springs extending around and in the rear of the other, whereby a low-resistance connection is formed between the two springs on their release by the heat-cartridge.

3. A device of the class specified, comprising a pair of terminals each provided with springs tending to separate from one another, a heat-cartridge holding said spring normally under restraint and adapted to permit the release of the same when operated, and a metallic bar or rod attached to one of the springs and having a bent end located in the rear of the other spring, whereby upon operation of the heat-cartridge the springs are released and one of the same comes into contact with the bent end of the bar or rod attached to the other, substantially as described.

4. A device of the class specified, comprising terminals 3 and 4 provided with protector-springs 7 and 8 and also with lightning-arrester contacts 9 and 10, a heat-cartridge A consisting of a body 11 of insulating material, provided with caps 12 and 13, a graphite stick 16, a trigger 14 held in a slotted portion of the cap 13 by solder, a spring 15 pressing on the bent end of the trigger 14 and a contact 17 connecting the graphite stick 16 and the cap 12, a bar or rod 18 secured to the spring 8 and having a bent end arranged in position in the rear of the spring 7, lightning-arrester electrodes 21, 21, and 22, 22, the former being in contact with the contacts 9 and 10, insulation between said contacts, a post 24 between the contacts 22, 22, and a terminal 26 connected with the post 24 for connecting the same to ground, substantially as described.

In witness whereof I hereunto subscribe my name this 27th day of January, A. D. 1903.

CHARLES A. ROLFE.

Witnesses:
A. MILLER BELFIELD,
I. C. LEE.